United States Patent
Wille et al.

Patent Number: 5,513,258
Date of Patent: Apr. 30, 1996

[54] METHOD AND APPARATUS FOR PROCESSING CALL NUMBER INFORMATION FOR A SWITCHING SYSTEM

[75] Inventors: Klaus Wille, Munich; Harold Linke, Olching; Karl-Heinz Hass, Munich, all of Germany

[73] Assignee: Siemens Aktiengesellschaft, Munich, Germany

[21] Appl. No.: 245,588

[22] Filed: May 18, 1994

[30] Foreign Application Priority Data

May 28, 1993 [DE] Germany .............. 43 17 893.6

[51] Int. Cl.⁶ ........................................... H04M 3/00
[52] U.S. Cl. ................. 379/280; 379/258; 379/289
[58] Field of Search .................. 379/258, 280, 379/289

[56] References Cited

U.S. PATENT DOCUMENTS

| | | | |
|---|---|---|---|
| 3,716,675 | 2/1973 | Marek, Jr. et al. | 379/289 |
| 4,600,812 | 7/1986 | Gerlits. | |
| 4,694,452 | 9/1987 | Beckinger et al. | 379/230 |
| 4,748,661 | 5/1988 | Edelstein et al. | 379/289 |
| 4,903,258 | 2/1990 | Kuhlmann et al. | 370/60 |
| 5,008,884 | 4/1991 | Yazawa et al. | 370/60 |
| 5,018,097 | 5/1991 | Kuhlmann et al. | 364/900 |
| 5,047,923 | 9/1991 | Elstner | 364/200 |
| 5,226,075 | 7/1993 | Funk et al. | 379/243 |
| 5,299,261 | 3/1994 | Bogart et al. | 379/353 |
| 5,339,356 | 8/1994 | Ishii | 379/280 |
| 5,343,517 | 8/1994 | Bogart et al. | 379/220 |

FOREIGN PATENT DOCUMENTS 2009564 6/1979 United Kingdom.

OTHER PUBLICATIONS

Siemens—Hicom 300 System, Private Communication Systems Division.

Primary Examiner—Jeffery Hofsass
Assistant Examiner—Daniel S. Hunter
Attorney, Agent, or Firm—Hill, Steadman & Simpson

[57] ABSTRACT

The controller of the switching system has a switching-oriented program that has two program parts allocated to it. A first program part is designed for processing call number information that has a first plurality of call number digit information. The second program part is designed for processing call number information that has a second, greater plurality of call number digit information. In the method of the invention, the call number plan of a private branch exchange is designed for a public switching system.

2 Claims, 2 Drawing Sheets

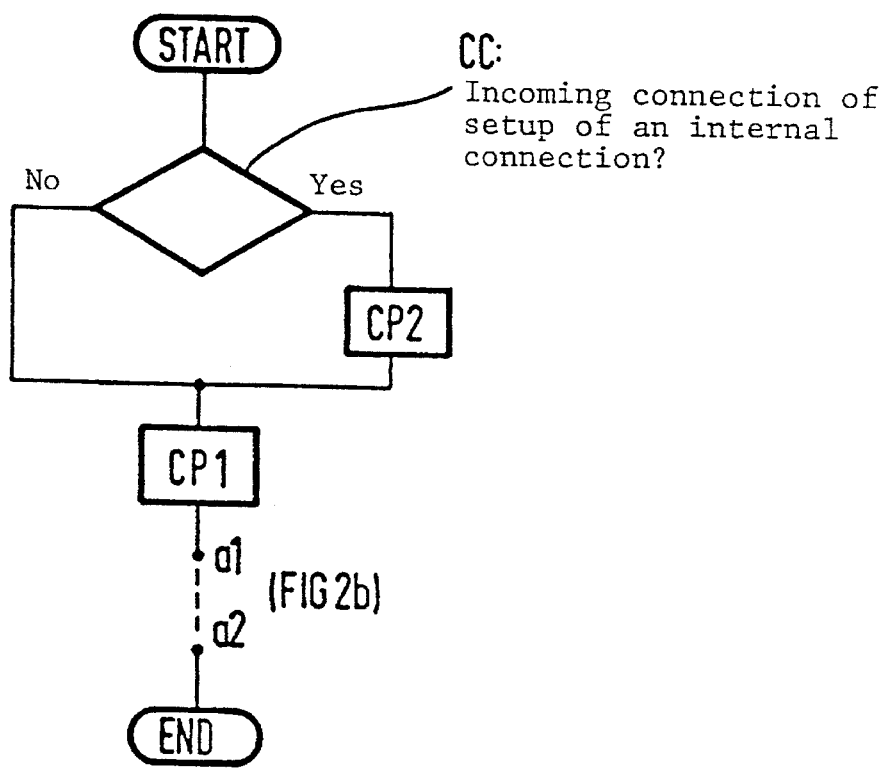
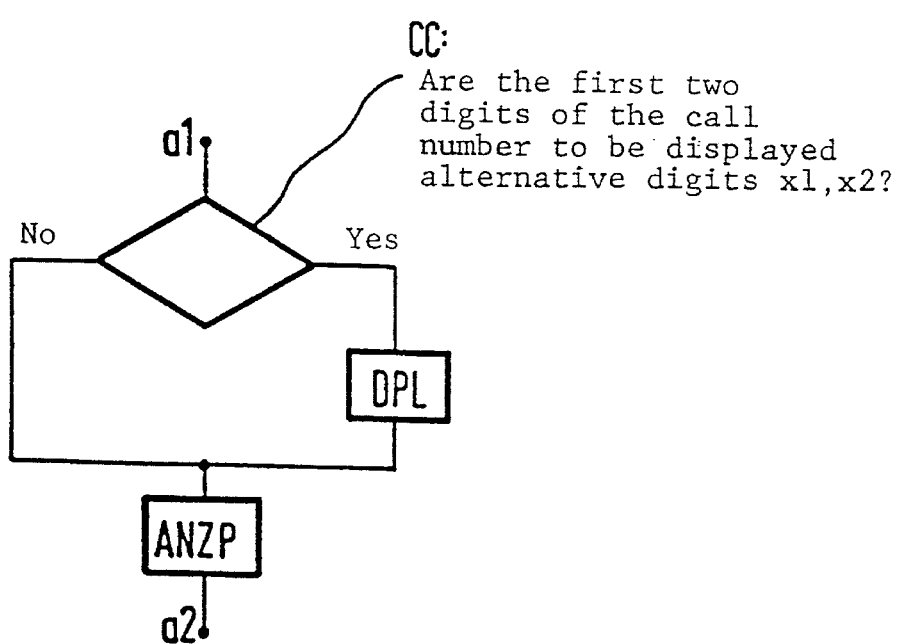

5,513,258

METHOD AND APPARATUS FOR PROCESSING CALL NUMBER INFORMATION FOR A SWITCHING SYSTEM

BACKGROUND OF THE INVENTION

1. Field of the Invention

The present invention is generally directed to a switching system and more specifically to a method and circuit apparatus for a switching system.

2. Description of the Related Art

A switching system for the private domain is already known from the product brochure of Siemens AG "HICOM 300 System Product Data", Order No. A 19 100 K 3161-G430X7600. For example, the known switching system allows an expansion up to 5120 ports (page 6 of the product brochure) and enables both a linking to public as well as to private networks (page 56 of the product brochure). Also, the known switching system can be coupled to what is known as a local area network (LAN).

Call number information that has up to 6 call number digit information can be allocated to the internal terminal equipment (page 22 of the product brochure: "Flexible Station Numbering"). The switching-oriented program of the known switching system is thus designed for processing call number information that has a maximum of 6 call number digit information. The known, private switching system thus enables the use of call numbers having exactly as many places as prescribed in standardized, international call number plans for the through-connection of public networks to private branch exchanges. Due to the maximum number of terminal equipment possibly used, there is no need in private branch exchanges for call numbers having more than 6 places. A subsequent expansion of the control software of such a private branch exchange to call numbers having more than 6 places also entails an extraordinarily great amount of work and cost outlay when the call number/selection code interpretation occurs in many switching-oriented situations upon call setup and upon performance feature activation.

British Patent Application GB 2009 564 A (corresponding to German Published Application 27 54 325) discloses a circuit arrangement for abbreviated dialing in a telecommunication switching system, particularly a telephone switching system. In the known circuit arrangement, indicator information to the main memory area for allocated call numbers from the address converter are supplied with the assistance of an abbreviated dialing signal dependent on the switching network chain address of the subscriber line of the calling subscriber. The indicator information is delivered from the appertaining main memory area to the called subscriber location for further use by using this address converter upon utilization of the call number dialed. Each of the appertaining subscriber stations has a main memory area in an abbreviated dialing memory for a call number of subscriber locations reachable by abbreviated dialing. The known circuit arrangement enables the storing of call numbers having a maximum of 12 digits and also enables traffic discrimination digits. However, measures for an expansion of call numbers to a plurality of digits beyond this are not provided in the known circuit arrangement.

SUMMARY OF THE INVENTION

It is an object of the present invention to provide a circuit apparatus for a switching system that is designed for processing expanded call numbers in a simple way.

It is another object of the invention to provide a circuit apparatus using private branch exchanges as public switching equipment for which 7-digit subscriber numbering is required.

It is a further object of the present invention to provide a circuit apparatus for a switching system having at least one controller with a control program for controlling switching-oriented procedures therein, the control program having a first program part for processing call number information having a first plurality of call number digit information and a second program part for processing call number information having a second, greater plurality of call number digit information; means for inputting the second plurality of call number digit information into the switching system, the second greater plurality of call number digit information having a first subset and a second subset thereof, means for transforming the first subset into a transformed call number digit information set, means for forming a combined set of call number digit information from the transformed call number digit information set and the second subset of the second greater plurality of call number digit information, and means for processing the combined set of call number digit information by using the first program part of the control program.

Also, the outlay for producing a private branch exchange into a public switching equipment which requires more than 6-digit numbering is comparatively slight in comparison to the production of a complete switching-oriented control program that is designed for 7-digit call numbers. A further advantage of the switching system of the invention is that work is carried out only with the 6-digit alternative call number in the administration and maintenance control, as well as in the administration and maintenance operations and also in the dependability system indicators and error messages. The administration and maintenance control program of the switching system that is designed for a 6-digit numbering standard in private branch exchanges thus need not be modified.

The objects of the present invention are achieved in the above-referenced apparatus operating in accordance with a method for processing call number information, having the steps of providing a switching system having at least one controller having a control program for controlling switching-oriented procedures therein, the control program having a first program part for processing call number information having a first plurality of call number digit information and a second program part for processing call number information having a second, greater plurality of call number digit information, inputting the second plurality of call number digit information into the switching system, the second greater plurality of call number digit information having a first subset and a second subset thereof, transforming the first subset into a transformed call number digit information set, forming a combined set of call number digit information from the transformed call number digit information set and the second subset of the second greater plurality of call number digit information, and processing the combined set of call number digit information by using the first program part of the control program.

A more detailed description of the invention is set forth below with reference to the following figures.

BRIEF DESCRIPTION OF THE DRAWINGS

FIGS. 2A and 2B are a flow chart of a method for the switching-oriented control of a switching system that can be implemented with the circuit apparatus of the present invention illustrated in FIG. 1.

DETAILED DESCRIPTION OF THE PREFERRED EMBODIMENTS

Figure 1:
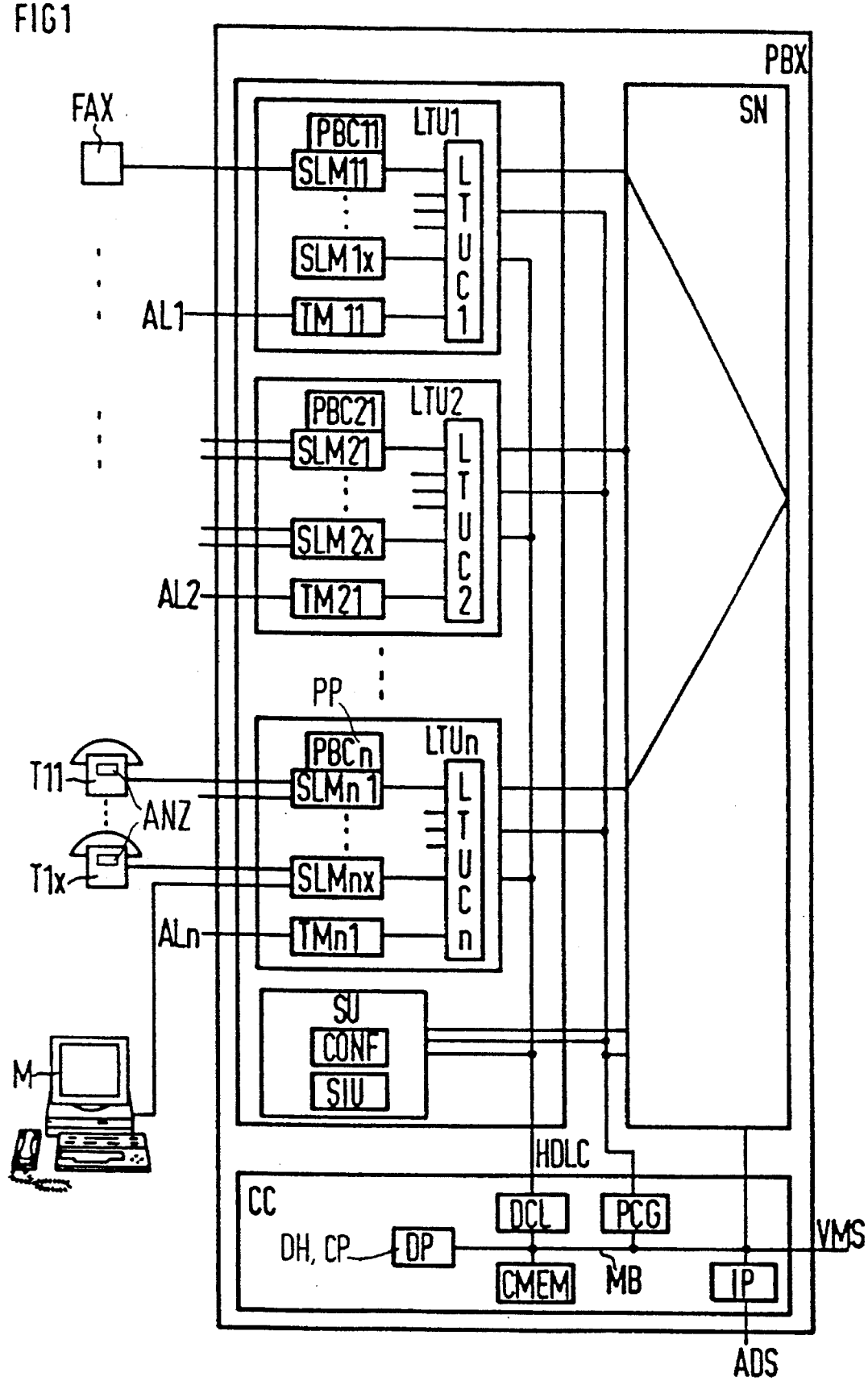
FIG. 1 is a circuit arrangement of the invention.

The switching system shown in FIG. 1 can be structured like the system disclosed in the initially described product brochure or like the system that is disclosed in European Patent Application EP 0 306 693 A1 (U.S. Pat. 4,903,258), EP 0303 870 A2 (U.S. Pat. 5,018,097) and EP 0 303 869 (U.S. Pat. No. 5,047,923). The software architecture of the known system is based on the following criteria.

The first architecture criterion relates to the tripartite division of the switching software into the function complexes of peripheral processing PP, device handler DH and call processing CP. The peripheral processing PP performs the transportation function and runs essentially on the line/trunk modules for the terminal equipment and lines. The device handler DH matches the interface to the peripheral processing PP to the ISDN interfaces to the call processing CP. The call processing CP produces the actual performances for the user surfaces of the terminal equipment or for the interfaces to the various sets. Inventively, the switching-oriented program has a first program part CP1, which corresponds to the switching-oriented control program of the afore-mentioned communication system and is designed for processing call number information that has a first plurality (for example, 6) of call number digit information, as well as a second program part CP2 for processing call number information that cover a second, larger plurality m (for example, 7) of call number digit information.

The second architecture criterion represents the state or event processing in the call processing CP oriented to services and terminal equipment. The service criterion is offered to the control software as ISDN protocol element. This control software identifies the type of apparatus in service-oriented fashion on the basis of the co-supplied device address.

The third architecture criterion for simple handling of the multitude of terminal equipment and services is the strict application of a dedicated database which the programs fundamentally access only on the logical level.

The system shown in FIG. 1 is a system central PBX having a controller CC that is connectable to what are referred to as periphery modules and to a switching network SN. In particular, the periphery modules comprise subscriber line modules SLM11 . . . SLM1X, SLM21 . . . SLM2X, SLMn1 . . . SLMnX as well as what are referred to as trunk circuit modules TM11, TM21 and Tmn1.

The subscriber line modules SLM are subscriber-oriented device attachments such as, for example, ISDN basic accesses for digital mono-functional and multi-functional terminal equipment, 1-channel terminal modules for terminal equipment such as digital voice terminal equipment and exchange terminal equipment as well as subscriber line circuits for analog voice terminal equipment and fax terminal equipment. The terminal equipment T11, T1x shown in FIG. 1 are digital voice terminal equipment and also comprise display means ANZ. The reference character FAX references a fax terminal device, whereas the reference character M represents a data terminal device. Whereas, dependent on the configuration level and configuring, call numbers having, for example, 4, 5 or 6 digits can be input in terminal equipment of a traditional private branch exchange, call numbers having, for example, 7 digits are input into the terminal equipment of the switching system shown in FIG. 1.

The trunk circuit modules TM11, TM21, Tmn1 serve the purpose of connection to public and/or private networks or special equipment and, for example, are ISDN basic accesses for ISDN inter-exchange traffic (exchange lines AL1, AL2, Aln) and ISDN interconnections (two channels of 64 kbits/s and ISDN signalling), as well as digital interface units, i.e. multiplex connections (30 channels of 64 kbits/s each) having the operating modes of inter-exchange traffic and interconnection traffic with ISDN signalling and interconnection traffic with channel-associated signalling.

All periphery modules SLM11 . . . , TM11 . . . have the same intrasystem interfaces. They couple the individual base channels B on which useful data, i.e. voice and/or data information are transmitted to an arbitrary selection from two multiplex channels (highways) having, for example, 32 channels of the switching network SN and forward the signalling information transmitted in a control channel D to the controller CC as HDLC protocol. Every periphery module comprises a controller PBC11 whose job is to allocate seized access channels to selected channels of the multiplex channels (highways), potentially with a controller LTUC1 . . . of an appertaining line trunk unit LTU . . . (European Patents 0 113 884 and 0 264 890; U.S. Pat. No. 4,694,452).

A plurality of periphery modules can be functionally combined to form a line trunk unit LTU. Every line trunk unit LTU1 . . . LTUn has a controller LTUC1 . . . LTUCn allocated to it and are connected to one another with the switching network SN via, for example, four voice/data multiplex channels. The message exchange between the periphery modules and the controller CC ensues in the known HDLC point-to-multipoint method via a signalling channel that is referenced HDLC in the figure.

What is referred to as a service unit SU can be allocated to a plurality of line trunk units LTU1 . . . LTUn. This service unit SU comprises a signalling unit SIU and, potentially, a conference apparatus CONF. The signalling unit SIU assumes the character supply of the system with call progress tones and, potentially, with announcements. The signalling unit SIU also assumes the reception of DTMF clock pulse selection characters and exchange dial tones. These functions are realized with signal processors in a known way. The signalling unit SIU is connected to the switching network SN via two voice/data multiplex channels having a fixed function allocation.

The switching network SN is preferably modularly constructed and is composed, for example, of a non-blocking time stage for 16 voice/data multiplex channels. By interconnecting two such basic modules, a switching stage arises for 1024 time slots (36 multiplex channels of 32 channels each). The non-blocking time stage formed in this way respectively connects two arbitrary time slots to one another from the respective 32 incoming and outgoing multiplex channels for voice or data. Broad band connections can also be produced in addition to 1-channel connections.

In cooperation with the controllers PBC11 . . . , LTUC1 . . . , the controller CC assumes the switching-oriented processing arising in accord with the peripheral structure. The controller CC has a data processor DP, a processor for signalling control DCL, a clock generator PCG, a memory CMEM and an interface processor IP that is connected to an administration and maintenance unit ADS that is not shown in FIG. 1. The memory CMEM contains a data base having configuration data. These components are connected to one another via a multibus MB, as shown in FIG. 1.

Processors of the series 80286/80386/80486 (Intel) are preferred for the data processor DP. The memory CMEM contains LSI dynamic RAM modules and error correction circuits. The processor DCL for signalling control serves for the execution of the HDLC protocol to the line trunk units LTU1 . . . LTUn and to the service unit SU. The clock generator PCG implements the clock supply of the telecommunication private branch exchange.

The controller CC of the switching system of the invention has a control program for controlling the switching-oriented procedures allocated to it. The control program has a first program part CP1 that is designed for processing call number information that, for example, cover 6 call number digit information (first plurality "n"). Further, the control program has a second program part CP2 that is designed for processing call number information that, for example, cover 7 call number digit information (second plurality "m") that are input into the switching system. The second plurality "m" is greater than the first plurality "n" of call number digit information. For example, the first plurality has 6 call number information, whereas the second plurality has 7 call number information. For example, a call number that has the 7 call number digit information $z1, z2, z3, z4, z5, z6, z7$ is input into a terminal device of the switching system of the invention.

Some of the call number digit information $z1, z2, z3, z4, z5, z6, z7$, namely the call number digit information $z1, z1, z3$ input into the switching system are transformed into call number digit information $x1, x2$ by a correspondingly fashioned control program part (CP2). This occurs, for example, with reference to a transformation table that, for example, is deposited the memory CMEM. This control program part forms a new call number having the call number digit information $x1, x2, z4, z5, z6, z7$ from the transformed call number information $x1, x2$ and from the non-transformed call number digit information $z4, z5, z6, z7$ of the call number input into the switching system. This new call number now has the first plurality n of call number digit information, this be equal to 6 in the example. After the formation of this new call number $x1, x2, z4, z5, z6, z7$, this new call number is processed in a known way by the switching-oriented control program, namely by the first program part CP1. By using this new call number, the connection is set up, for example, between two internal subscriber locations of the switching system. The connection of an external and an internal subscriber location is also produced.

The control program allocated to the controller CC further provides that the newly formed call number information $x1, x2, z4, z5, z6, z7$—after the processing of the first program part of the control program—is processed for a display of the call number information originally input into the switching system. This occurs in such a way that the transformed call number digit information $x1, x2$ are replaced by the corresponding, originally input call number digit information $z1, z2, z3$. To this end, the transformation table deposited in the memory CMEM is again accessed. The call number originally input into the switching system and having the digit information $z1, z2, z3, z4, z5, z6, z7$ is formed from the call number digit information $z1, z2, z3$ fetched from the transformation table and from the non-transformed call number digit information $z4, z5, z6, z7$. This retransformed call number is supplied to a control means of an optical display means at the respective destination subscriber terminal equipment. The afore-mentioned display control means that is not shown in FIG. 1 displays the re-transformed call number $z1, z2, z3, z4, z5, z6, z7$ on the corresponding optical display means in a known way.

The above-described transformation is based on the principle that those call number digit information of the call numbers input into the switching system that are transformed are unambiguous network-wide. In the described example, these are the call number digits $z1, z2, z3$. The alternative digits, the digit information $x1, x2$ in the described example, can have arbitrary values from 00–99 in a switching system of the invention. However the values actually provided as the alternative digits cannot be used in the switching system for other switching-oriented purposes, for example for an exchange bundle identifier, an inter-exchange traffic identifier or some other performance feature identifier.

The flow chart shown in FIG. 2a illustrates the cooperation of the first and second program parts. The controller CC of the switching system first checks to see whether an incoming connection is present or whether an internal connection is being set up. In the example illustrated here, this check occurs on the basis of the first three digits $z1, z2, z3$. Insofar as this check leads to a negative result, the first program part CP1 is activated in a known way and the corresponding switching-oriented procedures are realized. Given a positive result of the check, by contrast, the second program part CP2 is activated and some of the existing call number digit information $z1, z2, z3, z4, z5, z6, z7$, namely the call number digit information $z1, z2, z3$, are transformed into call number digit information $x1, x2$. A new call number having the call number digit information $x1, x2, z4, z5, z6, z7$ is formed of the transformed call number digit information $x1, x2$ and from the non-transformed call number digit information $z4, z5, z6, z7$.

Following thereupon, the first control program part CP1 is activated and the corresponding switching-oriented procedures are realized in a known way using n-digit call number.

The display of the A-subscriber can be provided within the framework of these switching-oriented procedures. As shown in FIG. 2b, for example, the controller CC checks whether the first digits of a call number to be displayed are composed of the alternate digits $x1, x2$ provided in the system. Given a negative result of this check, the activation of a corresponding program part ANZP ensues directly, the presentation of the call number on the provided, optical display means at the B-subscriber is realized therewith in a known way. Given a positive result of this check, a program part DPL is activated. This initiates the controller CC to replace the transformed call number digit information $x1, x2$ from the call number digit information formed by the transformed call number digit information $x1, x2$ and of the non-transformed call number digit information $z4, z5, z6, z7$ by the call number digit information $z1, z2, z3$ originally input into the communication system. Following thereupon, the display of the call numbers $z1, z2, z3, z4, z5, z6, z7$ ensues on the optical display means of the appertaining B-subscriber.

Although the invention has been described with respect to preferred embodiments, it is not to be so limited as changes and modifications can be made therein which are within the full intended scope as defined by the appended claims.

We claim:

1. An apparatus for processing call number information, comprising:
   a switching system having at least one controller having a control program for controlling switching-oriented procedures therein, said control program comprising a first program part for processing call number information having a first plurality of call number digit information and a second program part for processing call number information having a second, greater plurality of call number digit information;

means for inputting said second plurality of call number digit information into said switching system, said second greater plurality of call number digit information comprising a first subset and a second subset thereof;

means for transforming said first subset into a transformed call number digit information set;

means for forming a combined set of call number digit information from said transformed call number digit information set and said second subset;

means for processing said combined set of call number digit information by using said first program part of said control program;

means for replacing said transformed call number digit information set with said first subset of said second plurality of call number digit information to produce said original second plurality of call number digit information; and means for displaying said second plurality of call number information.

2. A method for processing call number information, comprising the steps of:

providing a switching system having at least one controller having a control program for controlling switching-oriented procedures therein, said control program comprising a first program part for processing call number information having a first plurality of call number digit information and a second program part for processing call number information having a second, greater plurality of call number digit information;

inputting said second plurality of call number digit information into said switching system, said second greater plurality of call number digit information comprising a first subset and a second subset thereof;

transforming said first subset into a transformed call number digit information set;

forming a combined set of call number digit information comprising said transformed call number digit information set and said second subset;

processing said combined set of call number digit information by using said first program part of said control program;

replacing said transformed call number digit information set with said first subset of said second plurality of call number digit information to produce said original second plurality of call number digit information after said processing step; and displaying said second plurality of call number information.

* * * * *